Patented Aug. 7, 1923.

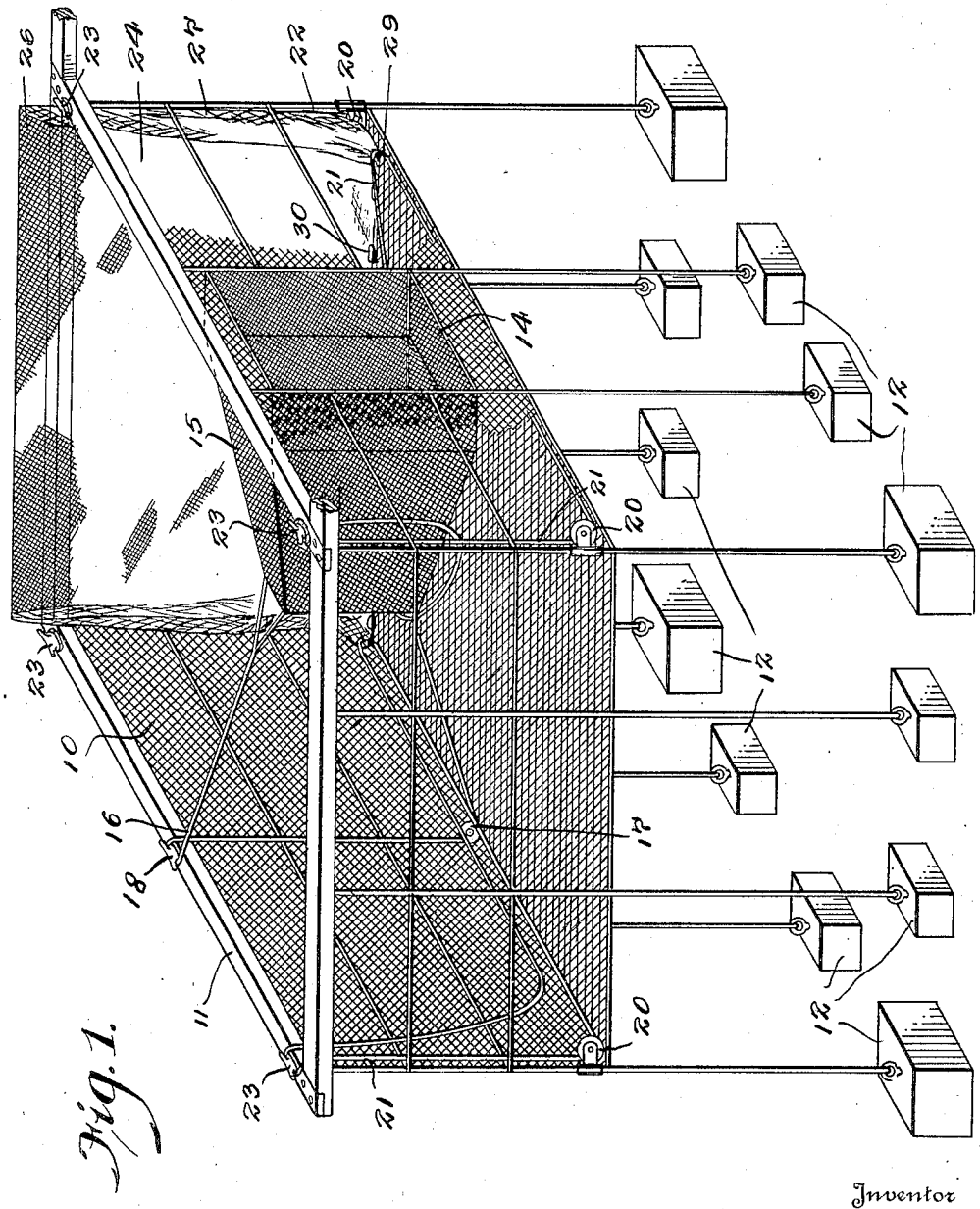

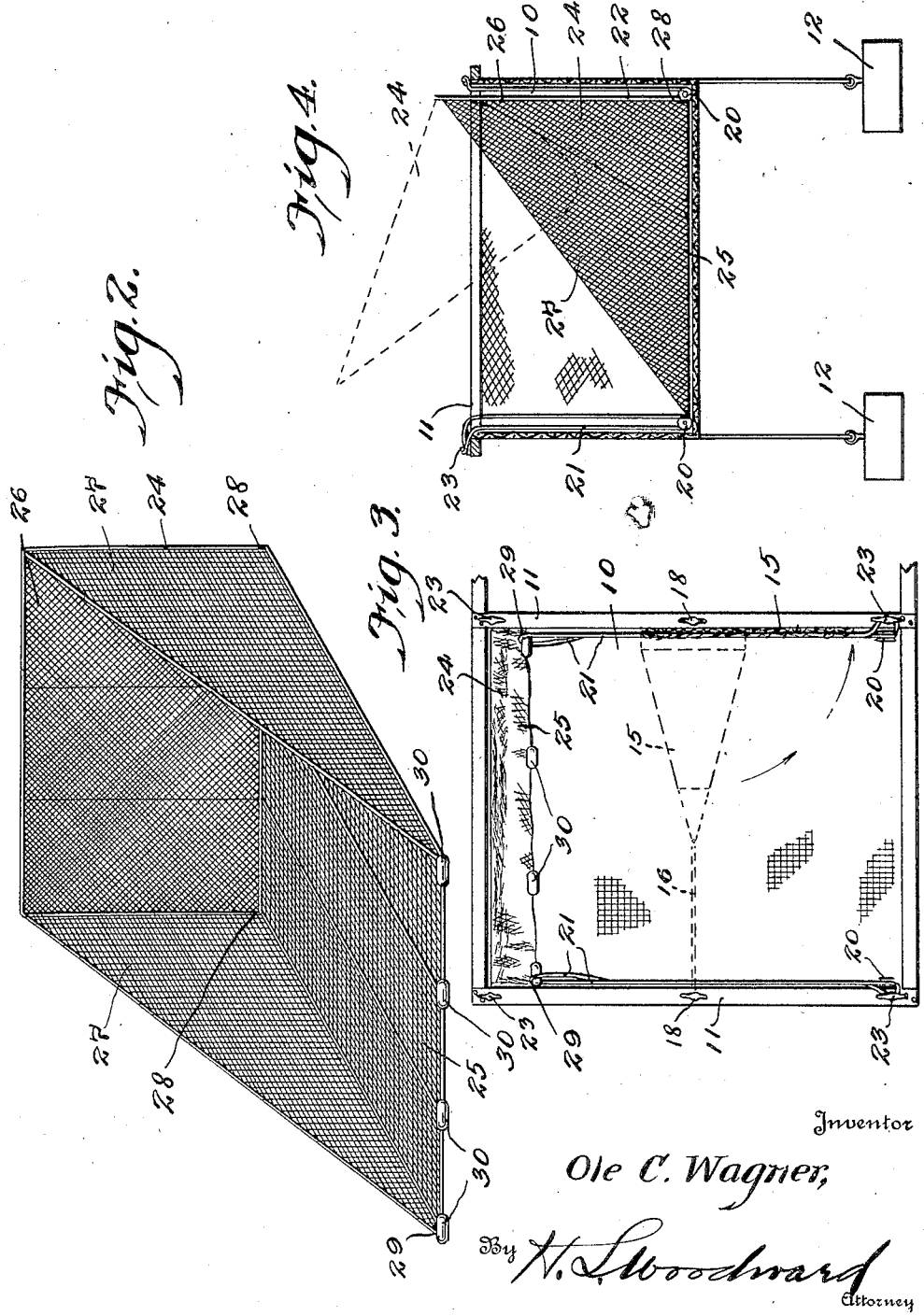

1,463,857

UNITED STATES PATENT OFFICE.

OLE C. WAGNER, OF SEATTLE, WASHINGTON.

WIRE SPILLER AND LIFTING NET.

Application filed February 26, 1923. Serial No. 621,252.

*To all whom it may concern:*

Be it known that I, OLE C. WAGNER, a citizen of the Kingdom of Norway, residing at Seattle, in the county of King and State of Washington, have invented certain new and useful Improvements in Wire Spillers and Lifting Nets, of which the following is a specification.

The invention has for an object to effect improvements in traps especially suitable for deep sea fishing, and aims to make more easy the use of wire net traps, retaining therewith the advantages and transfer of the catch incident to cotton netting.

It is a specific object to enable the laying and construction of traps with the use of wire netting, on various approved plans, and to enable removal of the catch without disturbance of the wire mesh netting, by the use of my invention, regardless of the form of trap employed. For this reason, I have only illustrated in the present drawings the pot element of a trap, omitting the spiller and other devices by which the fish are led to the pot, but showing the connection between the spiller and pot.

Additional objects, advantages and features of invention will appear from the construction, arrangement and combination of parts involved, as will be understood from the following description and accompanying drawings, wherein, Figure 1 is a perspective view of a pot with my invention associated therewith, Fig. 2 is a similar view of the lifting net, removed from the pot, Fig. 3 is a top view of the pot with the spiller connection swung to one side for operation of the lifting net, Fig. 4 is a cross section of the pot from the right of Figs. 1 and 3, showing the lifting net fully extended, and showing it in raised position in dotted lines.

There is illustrated a pot 10, including the floating frame 11, a portion of which is omitted, and from which a suitable series of weights or anchors 12 are suspended to hold the device in proper position. The pot proper comprises wire netting suspended upon the frame in a suitable manner, and reinforced in any customary way to form a rectangular basket-like enclosure, adapted to receive fish in the pot by any usual construction of spiller net, the fish entering the pot through the rectangular opening 14 which is formed in one side, and in which a tunnel element 15 is fitted and attached, the tunnel element being formed of cotton mesh and being held to form by ropes 16 extended from its inner end to the opposite side of the pot, one rope from the lower part of the tunnel being extended beneath a pulley 17 at the lower part of the pot, while the rope from the upper part of the tunnel is secured to a cleat 18 on the frame 11, the rope from the pulley 17 being likewise secured to the same cleat. The ropes 16 are of such length and arrangement that when desired they may be unfastened from the cleat and the end of the tunnel swung against the inner side of the pot, so that it will lie out of the way closing the opening 14 against egress of fish.

Upon the inside of the pot at each corner close to the bottom, a pulley 20 is mounted, and around each pulley there is extended a rope 21 at one end of the pot, while shorter ropes 22 may be extended around the pulleys adjacent the opposite end. The ropes 21 have both ends secured to cleats 23 at the top of the frame, and the ropes 22 are similarly secured. A lifting net 24 is provided, which is substantially in the form of a rectangular solid divided on a diagonal plane. It includes a bottom 25 which equals the full interior measurements of the bottom of the pot 10, and is of corresponding shape. It has an end 26, the height of which is slightly greater than the depth of the pot, and which extends for the full width of the pot. Between this end and bottom, there are extended side elements 27 of triangular form. The lower inner corners 28 of the net 24 are connected to the ropes 22 so that by manipulation of these ropes the corners of the lifting net may be drawn snugly into the corners of the pot thereadjacent. As indicated in Figure 1 the upper edge portion of the well 26 is supported in any suitable manner on the frame 11, while the ropes 21 are connected to respective front corners 29 of the lifting net. Suitable weights 30 are provided upon the front edge of the lifting net whereby it will be held snugly against the bottom of the pot when drawn across the pot, as will be described.

When the trap is set for receiving fish, the parts may be disposed as shown in Fig. 1, the lifting net being hung close adjacent one end wall of the pot, and gathered closely in that end, so as to occupy as little room as possible. The tunnel 15 is extended as illustrated. When it is desired to remove fish from the trap, the ropes 16 are released from the cleat 18, and the tunnel 15 swung while being kept taut, into position close against the adjacent side of the pot, and there secured. The ropes 21 are then operated to draw the front edge 25 of the lifting net across the bottom of the pot until it is fully extended as shown in Fig. 2, and indicated in full lines in Fig. 4. The movement of the net in this manner is accomplished by drawing upon one end of each rope 21, and as soon as the net has been fully extended, the other ends of the ropes 21 are drawn up causing lifting of the net closely up beside the sides of the pot, and at the same time the ropes 22 should be loosened to permit the corners 28 of the lifting net to become free as far as required. Either by hand or hoisting apparatus lifting of the net 24 may be continued until it is hoisted as shown in dotted lines in Fig. 4, or further as may be determined. At the position dotted in Fig. 4, the fish may be removed by dip nets, or if special hoisting apparatus is available the entire lifting net may possibly be hoisted from the pot and the contents deposited in the hold of a vessel, after methods readily understood in the art. In order to permit clearance of the lifting net and the rope 16 attached to the upper side of the tunnel 15, the rope 16 may preferably be laid outside of the frame 11 while the lower reach of this rope may extend initially beneath the ropes 21.

It will be seen from this disclosure that it is possible to use a trap the essential parts of which are constructed entirely of wire netting, so that the strain incident to catching of fish may be sustained by more substantial material; and yet for the purpose of removing the fish, cotton mesh may be made available, obviating the necessity for hoisting out the wire mesh elements and thereby saving these from damage in wear due to handling, as would necessarily occur.

The net constructed in this manner has been employed to good advantage, and has resulted in a very marked saving in expense for nets. In making the equipment, it is adapted to be constructed at a low cost and without expert service, as will be appreciated.

What is claimed:—

1. In a net of the character described, a permanent wire pot net having an entrance, a movable entrance connection, and a movable lifting net of cotton or like mesh of a size to extend over the floor of the pot, adapted to lie at times in inoperative position at one side of the pot, and means to move the lifting net to extended position at one side of the pot, and means to move the lifting net to extended position and to lift it as described.

2. The structure of claim 1 in which the lifting net includes an end and bottom corresponding in size to like adjacent parts of the pot and connecting triangular sides, the said means to move the lifting net being connected to the outer edge of the bottom thereof.

3. The device of claims 1 and 2 in which a releasable anchoring means is provided connected to the bottom of the lifting net at the junction of said end and bottom.

4. In a fish trap the combination of a stationary wire pot net of a lifting net of fiber cord extensible therewithin and adapted to receive the fish introduced into the pot, means to extend the second net removably in the pot net, and means to hoist the second net from the first.

In testimony whereof I have affixed my signature in presence of two witnesses.

OLE C. WAGNER.

Witnesses:
 INER THUE,
 F. B. CARPENTER.